United States Patent [19]

Rice et al.

[11] Patent Number: 4,817,046
[45] Date of Patent: Mar. 28, 1989

[54] DETECTION OF ENGINE FAILURE IN A MULTI-ENGINE AIRCRAFT

[75] Inventors: Robert W. Rice, Sandy Hook, Conn.; David H. Sweet, Tequesta, Fla.; Charles W. Evans, Norfolk; Gregory P. Wright, Ansonia, both of Conn.; James J. Howlett, North Haven, Conn.; Nicholas D. Lappos, Madison, Conn.; Mark A. Johnston, Windsor, Conn.

[73] Assignee: United Technologies Corporation, Hartford, Conn.

[21] Appl. No.: 849,983

[22] Filed: Apr. 10, 1986

[51] Int. Cl.$^4$ ............................................. G08B 21/00
[52] U.S. Cl. ........................... 364/551.01; 364/431.02; 73/117.3; 60/30.091
[58] Field of Search ...................... 364/431.01, 431.02, 364/550; 73/116; 60/39.091, 39.281, 32.15; 244/17.13

[56] References Cited

U.S. PATENT DOCUMENTS

| 4,218,878 | 8/1980 | Kiscaden et al. | 60/39.091 |
| 4,423,593 | 1/1984 | Zagranski et al. | 60/39.161 |
| 4,454,754 | 6/1984 | Zagranski et al. | 73/117.3 |
| 4,488,236 | 12/1984 | Morrison et al. | 364/442 |
| 4,493,465 | 1/1985 | Howlett et al. | 244/17.13 |
| 4,500,966 | 2/1985 | Zagranski et al. | 364/432 |
| 4,546,353 | 10/1985 | Stockton | 340/966 |
| 4,619,110 | 10/1986 | Moore | 60/39.091 |

Primary Examiner—Parshotam S. Lall
Assistant Examiner—Thomas G. Black
Attorney, Agent, or Firm—Peter R. Ruzek; Gerald E. Linden

[57] ABSTRACT

Primary logic (116–128) for engine failure detection in a multi-engine aircraft is based on thresholds for engine torque (Q), gas generator speed (NG), power turbine inner stage temperature (T5), power turbine speed (NF), throttle setting (PLA), and throttle manipulation (PLADOT).

Subroutines for return to dual engine operation (110), backup of the primary logic (200,300) and remaining engine failure (200) are disclosed.

6 Claims, 1 Drawing Sheet

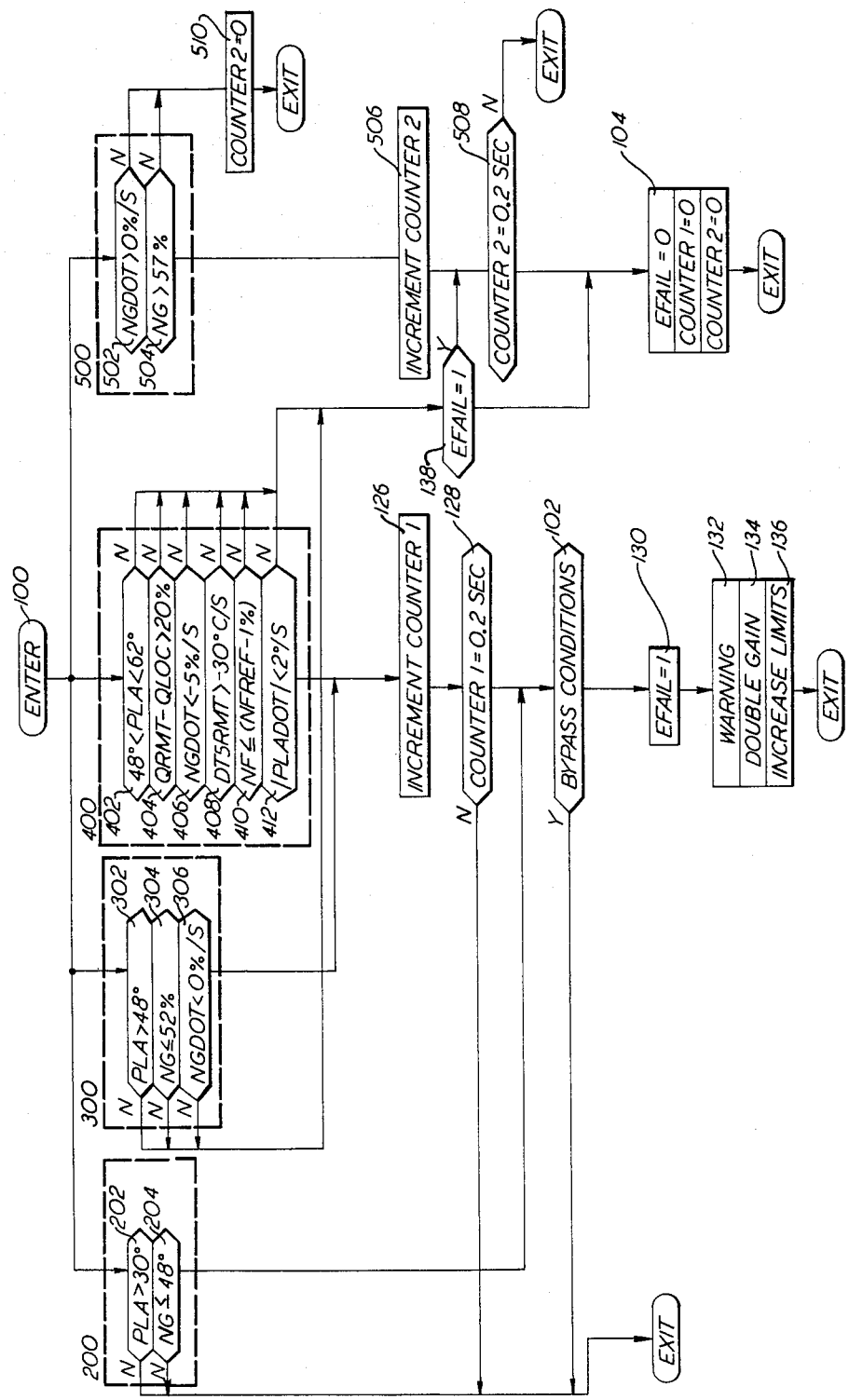

DETECTION OF ENGINE FAILURE IN A MULTI-ENGINE AIRCRAFT

BACKGROUND OF THE INVENTION

A single engine failure on a multi-engine aircraft, such as a helicopter, may require immediate corrective measures to be applied by the pilot, copilot and/or autopilot. For instance, commonly-owned U.S. Pat. No. 4,500,966 discloses super contingency aircraft engine control in response to an engine failure.

Waiting for engine speed to drop below ground idle speed before signaling an engine failure may take up to four or five seconds. This results in an excessive delay in applying corrective action. On the other hand, increased sensitivity may result in decreased veracity. False indications of engine failure are also undesirable.

DISCLOSURE OF THE INVENTION

It is an object of this invention to provide a quick, reliable technique for detecting engine failures.

According to the invention, primary logic for engine failure detection in a multi-engine aircraft is based on thresholds for engine torque (Q), gas generator speed (NG), power turbine inner stage temperature (T5), power turbine speed (NF), throttle setting (PLA), and throttle manipulation (PLADOT).

Subroutines for return to dual engine operation, backup of the primary logic and remaining engine failure are disclosed.

Other objects, features, and advantages of the invention will become apparent in light of the following description thereof.

BRIEF DESCRIPTION OF THE DRAWINGS

FIG. 1 is a flowchart of the software routine for implementing the invention is an electronic engine control.

Best Mode for Carrying Out the Invention

Electronic engine controls that maintain preset engine operating characteristics and/or maintain engine operation within preset limits are well known. In the context of a free turbine engine, such parameters as gas generator speed (NG), free turbine speed (NF), power turbine inner stage temperature (T5), and engine output torque (Q) are monitored to provide safe, efficient engine control by automatically varying fuel flow (WF) to provide the desired output power to maintain rotor speed constant while the pilot varies the collective (CLP) to change the helicopter flight path. The pilot may also change the engine power output via the power lever or throttle (PLA).

U.S. Pat. Nos. 4,500,966, 4,423,593, 4,488,236, and 4,493,465 and U.S. application Ser. No. 519,332 now abandoned, and U.S. application Ser. No. 562,794 now U.S. Pat. No. 4,648,797 disclose electronic engine controls in which the present invention could readily be implemented by applying the teachings herein.

The invention is described in the context of a two-engine helicopter, such as the Sikorsky S-76B. The overall function of the system is to detect, both reliably and rapidly, conditions indicative of an engine failure, and to provide suitable inputs to an electronic engine control for operating the remaining engine. A cockpit indication of engine failure is also provided.

Basically, in order to detect and latch an engine failure, the following conditions must be met simultaneously for at least 0.2 seconds:
 1. Throttles in fly detent,
 2. A torque (Q) split between the engines in excess of 20 percent,
 3. A rate of decay of gas generator speed (NG) on the failed (local) engine in excess of −5 percent RPM/second,
 4. No loss of power (T5) on remaining engine,
 5. A droop of at least 1.0 percent below the power turbine reference,
 6. No intentional movement of the engine throttles.

If an engine failure is detected, the following occurs:
 1. Light the "Engine Out" lamp and sound aural warning to the pilot when a failed engine has been detected.
 2. Double the gain of the NF governing loop to boost torque required to maintain power turbine speed on the remaining engine.
 3. Change the following limits on the remaining engine for single engine operation:
  Raise engine torque limit,
  Raise engine T5 limit,
  Raise engine NG limit.

If an engine failure has been detected and latched, return to dual engine control will only occur if the following are met for at least 0.2 seconds:
 1. Throttles in fly detent,
 2. Gas generator rate of change of "failed" engine in excess of 0 percent RPM/sec.,
 3. Gas generator speed in excess of 57 percent RPM.

The basic engine failure diagnostic routine of this invention is described in FIG. 1. The routine is accessed at a step 100, and is applicable to each engine. A local engine and a remote engine are discussed. Four subroutines 200, 300, 400, and 500 are then simultaneously processed.

In the subroutine 200, it is determined at a step 202 whether the power lever angle (PLA) for the local engine is greater than 30°, and at a step 204 it is determined whether the gas generator speed (NG) for the local engine is less than or equal to 48%.

If both conditions are satisfied, certain bypass conditions are checked in a step 102.

The conditions in the step 102 are:
 Is either engine in a training mode?
 Has the either engine failed to manual control?
 Is the engine overspeed test deployed?
 Is the local engine operation with Power Lever Angle (PLA) less than 20° (i.e., single engine operation with the local engine at round idle)?

If the bypass conditions are met, the routine is exited and reentered at the step 100. If the bypass conditions are not satisfied, an EFAIL flag is set to ONE at a step 130.

By setting the EFAIL flag to ONE, the following steps are performed. In a step 132, a visual and/or aural warning indicate to the pilot that the local engine has failed. In a step 134, the gain of the power turbine speed governing loop for the remote engine is doubled to boost the torque required to maintain the power turbine speed in the remote engine. (In a three engine situation, the gains in the two remote engines would be increased by 3/2.) Then in a step 136 the torque limit, NG limit, and T5 limit in the electronic engine control for the remote engine(s) are increased to assure power available in the remote engine(s) for a safe landing. If the failure logic could be made absolutely fail-safe, the local engine could be shut down by the routine at this point.

Then the routine is exited, and reentered at the step 100. The routine is also reentered at the step 100 if the results of either step 202,204 are negative.

In the subroutine 300, it is determined at a step 302 whether the power lever angle (PLA) for the local engine is greater than 48°, at a step 304 whether the gas generator speed (NG) for the local engine is less than or equal to 52 percent, and at a step 306 whether the rate of change in gas generator speed (NGDOT) for the local engine is negative. If all three conditions are satisfied, a first counter (timer) is incremented at a step 126, and at a step 128 it is determined whether the first counter has timed out to 0.2 seconds. If so, the bypass conditions are checked in the step 102. If not, the routine is reentered at the step 100.

If any of the test results 302-306 are negative, it is determined in a step 138 whether the EFAIL flag is ONE. If it is not, in a step 104 the EFAIL flag is set to zero, the first counter is set to zero, and a second counter (timer) is set to zero. Then, the routine is exited and reentered at the step 100.

If the EFAIL flag is ONE at the step 138, then it is determined in a step 508 whether the second counter has timed out to 0.2 seconds. If it has, the routine proceeds to the step 104. If it has not, the routine is exited and reentered at the step 100.

The subroutine 500 consists of steps 502 and 504. In the step 502 it is determined whether the rate of change in gas generator speed (NGDOT) for the local engine is positive. In the step 504 it is determined whether the gas generator speed (NG) for the local engine is at least a threshold speed of 57 percent. If both test results are positive, the second counter is incremented at the step 506, and at the step 508 it is determined whether the second counter has timed out. If either of the test 502,504 results are negative, the second counter is set to zero at a step 510, and the routine is exited and reentered at the step 100. The subroutine 500 allows a return to dual engine control if on the previous pass (cycle of the routine) a failure for the local engine has been falsely indicated.

In the subroutine 400 the steps 402-412 are performed. In the step 402, it is determined whether the power lever angle (PLA) is in the fly detent (between 48° and 62°). In the step 404, it is determined whether the torque split between the local engine (QLOC) and the remote engine (QRMT) is above a threshold of 20%. In the step 406, it is determined whether the rate of change in the gas generator speed (NGDOT) for the local engine is decelerating faster than a threshold of 5%/second. In the step 408, it is determined whether the rate of change of power turbine inner stage temperature for the remote engine (DT5RMT) is increasing, steady, or decreasing slightly (i.e., not more than 30° C./second). (If the remote engine is decelerating too rapidly this is indicative of dual engine deceleration, which is normal.) In the step 410, it is determined whether the power turbine speed (NF) for the local engine is at least within a threshold, such as 1 percent of its reference speed (NFREF), as established in the electronic engine control. In the step 412, it is determined whether the absolute value of the rate of change for the power lever angle associated with the local engine is less than a threshold, such as 2°/second, which is indicative of no advertent pilot manipulation of the power lever in either direction. (Advertent manipulation of the power lever could provoke indications of an engine failure.)

If the results of the step 402-412 are all positive, the routine proceeds to the step 126. If not, the routine proceeds to the step 138 wherein it is determined whether the EFAIL flag is one. If it is, the routine proceeds to the step 508. If it is not, the routine proceeds to the step 104.

The above-described logic does not detect a simultaneous dual engine failure. Nor does it detect a remaining engine failure, since there would be no torque split (step 404). The subroutine 200 is a back-up to the primary logic of the subroutine 400 and also provides basic engine out indication for loss of the remaining engine. The subroutine 300 improves the detection (ratio) time required for engine failures at low powers (partial power descents and autorotation where the engine is at flight idle) where other indications (Q split) are not apparent.

It should be understood that the above described limits and thresholds are experimentally derived for particular engine types. The numbers employed in the above description are applicable to the Pratt & Whitney, Canada, PT6B-36 engines as used in the Sikorsky S-76B helicopter.

We claim:

1. A method of detecting an engine failure in a multi-engine aircraft having at least two engines each of which includes a gas generator and a power turbine having an inner stage and is operated in dependence on the angle of a power lever, and an electronic engine control unit for each engine so that the engine associated with the respective control unit constitutes a local engine, and each remaining engine constitutes a remote engine, comprising:

sensing whether the power lever angle for the local engine (PLA) is between a first value and a second value;

sensing whether the difference in torque between the local engine and the remote engine(s) exceeds a first threshold;

sensing whether the gas generator speed for the local engine (NGDOT) is decreasing at a rate in excess of a second threshold;

sensing whether the power turbine inner stage temperature of the remote engine (DT5RMT) is increasing, steady, or decreasing at a rate less than a third threshold;

sensing whether the power turbine speed of the local engine (NF) is below its reference speed by a margin;

sensing whether there is not advertent pilot manipulation of the power lever associated with the local engine; and signaling failure of the local engine in response to the simultaneous satisfaction of all of the above conditions for X seconds.

2. The method of claim 1 wherein:
the first value is 48°;
the second value is 62°;
the first threshold is 20%;
the second threshold is −5%/second;
the third threshold is −30° C./second;
the margin is 1%; and X is 0.2.

3. The method of claim 1 wherein the local engine is allowed to be reset in response to the simultaneous satisfaction of the following conditions for Y seconds:
the gas generator speed for the local engine is increasing; and the gas generator speed for the local engine is greater than a fourth threshold.

4. The method of claim 3 wherein;
Y is 0.2; and
the fourth threshold is 57%.

5. A method of detecting an engine failure in a multi-engine aircraft having at least two engines each of which includes a gas generator and is operated in dependence on the angle of a power lever, and an electronic engine control unit for each engine, comprising, for each engine that is associated with the respective control unit to constitute a local engine:

sensing whether the power lever angle for the local engine (PLA) has at least a predetermined value;
sensing whether the gas generator speed of the local engine (NG) is less than or equal to a threshold;
sensing whether the gas generator speed for the local engine (NGDOT) is decreasing for Z seconds; and
signaling failure of the local engine in response to the simultaneous satisfaction of all of the above conditions.

6. The method of claim 5, wherein;
the predetermined value is 48°;
the threshold is 52%, and
Z is 0.2.

* * * * *